(12) United States Patent
Noldus et al.

(10) Patent No.: US 8,325,887 B2
(45) Date of Patent: Dec. 4, 2012

(54) METHOD OF AND A COMMUNICATIONS SYSTEM FOR PROVIDING, TO A CALLING PARTY, INFORMATION CONCERNING A MESSAGE PLAYED TO THE CALLING PARTY

(75) Inventors: Rogier August Caspar Joseph Noldus, Goirle (NL); Jos den Hartog, Capelle a/d Ijssel (NL); Daniel Johannes Josephus Adriaan Akkermans, Oosterhout (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 843 days.

(21) Appl. No.: 12/159,567

(22) PCT Filed: Dec. 30, 2005

(86) PCT No.: PCT/EP2005/014204
§ 371 (c)(1),
(2), (4) Date: Nov. 17, 2008

(87) PCT Pub. No.: WO2007/076885
PCT Pub. Date: Jul. 12, 2007

(65) Prior Publication Data
US 2009/0207981 A1 Aug. 20, 2009

(51) Int. Cl.
*H04M 1/64* (2006.01)
(52) U.S. Cl. ............... 379/88.23; 348/14.01; 370/352; 379/74; 379/88.11; 379/88.12; 379/88.17; 379/88.18; 709/203

(58) Field of Classification Search .......... 370/259–271, 370/351–356; 379/201.01, 201.02, 207.01–207.16, 379/265.01–266.1, 372–376.02, 418, 67.1–93.25, 379/101.01–106.02, 114.1–114.13, 142.01–142.18, 379/211.01–213.01, 221.06; 348/14.01–14.16; 704/270–278; 709/201–207, 217–248
See application file for complete search history.

(56) References Cited

U.S. PATENT DOCUMENTS

| | | | | |
|---|---|---|---|---|
| 6,385,308 | B1 * | 5/2002 | Cohen et al. | 379/88.23 |
| 6,603,844 | B1 * | 8/2003 | Chavez et al. | 379/114.13 |
| 6,857,024 | B1 * | 2/2005 | Chen et al. | 709/231 |
| 6,970,548 | B2 * | 11/2005 | Pines et al. | 379/218.01 |
| 7,072,644 | B2 * | 7/2006 | Ahn et al. | 455/414.1 |
| 7,187,761 | B2 * | 3/2007 | Bookstaff | 379/201.01 |
| 7,224,788 | B1 * | 5/2007 | Rhee et al. | 379/207.02 |
| 7,512,421 | B2 * | 3/2009 | Kim et al. | 455/567 |

(Continued)

FOREIGN PATENT DOCUMENTS
EP    1 081 928 A2    3/2001
(Continued)

*Primary Examiner* — Hemant Patel

(57) ABSTRACT

A method of and a communications system for providing a calling party (1) information (27) of a message (18) that is played to the calling party (1) in a communications system, when the calling party (1) calls (10) a called party (2) and the called party (2) is being alerted (13) of the call and/or after the called party has disconnected from the call. The information (27) is provided electronically on request (24) of the calling party (1). The calling party (1) may be prompted (28) to indicate (24) whether to receive the information (27). The prompt (28) may be provided while the message (18) is playing. The information (27) to be provided may include downloading of the message (18) or part thereof or content comparable with the message (18), such as an audio clip, a video clip or as a ring tone to be used by the calling party (1).

31 Claims, 6 Drawing Sheets

U.S. PATENT DOCUMENTS

| | | | |
|---|---|---|---|
| 2004/0114732 A1* | 6/2004 | Choe et al. | 379/88.17 |
| 2004/0120494 A1* | 6/2004 | Jiang et al. | 379/210.01 |
| 2004/0174983 A1* | 9/2004 | Olschwang et al. | 379/377 |
| 2005/0037793 A1* | 2/2005 | Urata et al. | 455/517 |
| 2005/0117726 A1* | 6/2005 | DeMent et al. | 379/142.01 |
| 2005/0163300 A1* | 7/2005 | Kawakami et al. | 379/207.16 |
| 2005/0180554 A1* | 8/2005 | Alston et al. | 379/207.16 |
| 2005/0207555 A1* | 9/2005 | Lee et al. | 379/207.16 |
| 2006/0023862 A1* | 2/2006 | Sutcliffe | 379/257 |
| 2006/0147011 A1* | 7/2006 | Moody et al. | 379/207.16 |
| 2006/0147012 A1* | 7/2006 | Moody et al. | 379/207.16 |
| 2006/0215829 A1* | 9/2006 | Schwartz | 379/207.02 |
| 2006/0233328 A1* | 10/2006 | Radziewicz et al. | 379/88.25 |
| 2007/0003047 A1* | 1/2007 | Batni et al. | 379/215.01 |

FOREIGN PATENT DOCUMENTS

| | | |
|---|---|---|
| WO | WO 99/35751 A1 | 7/1999 |
| WO | WO 2004/056140 A1 | 7/2004 |

* cited by examiner

METHOD OF AND A COMMUNICATIONS SYSTEM FOR PROVIDING, TO A CALLING PARTY, INFORMATION CONCERNING A MESSAGE PLAYED TO THE CALLING PARTY

FIELD OF THE INVENTION

The present invention relates to communications systems and, more particularly, to fixed and mobile telephone systems for providing information to a calling party of a message that is played to the calling party.

BACKGROUND OF THE INVENTION

In fixed and/or cellular radio telecommunications systems, such as the Public Switched Telephone Network (PSTN) or the Global System for Mobile communications (GSM), for example, a so-called Personalized Greeting Service (PGS) may be applied. If a first user or called party has a subscription to PGS, a second user or calling party when calling the first user, receives a message instead of a ringback tone. While the called party is alerted to the call, the message is played to the calling party.

The message may comprise a spoken message, an audio message such as a music clip or song, a video clip, a picture or the like.

Suppose that the message played is a music clip. If the calling party would like to hear this music clip again, or to hear the song as a whole, than he or she needs to find out the title of the song, for example, by searching through the Internet or another data source. If the song is not available for downloading or the song cannot be found at all, the calling party has spent a lot of time and effort without any success.

With the existing PGS, a calling party that would like to retrieve the music clip, has to perform a number of actions. That is, remembering the music clip, searching through the Internet, finding a download site for the clip, making payments (if any) and receiving the downloaded file into a communications terminal or other device for playing the clip back or using same for other purposes.

SUMMARY OF THE INVENTION

It is a first object of the present invention to relieve the steps for a calling party to retrieve a message or part of a message or content comparable to a message played to the calling party, such as in the course of PGS.

It is a further object of the present invention to provide the calling party an easy solution for downloading a message or part of a message or content comparable to the message played to the calling party, such as in the course of PGS, for use thereof by the calling party.

These and other objects of the present invention are achieved by a method of providing a calling party information of a message that is played to the calling party in a communications system while a called party is being alerted of a call and/or after a called party has disconnected from a call, wherein the information is electronically provided on request of the calling party.

With the method according to the present invention, if a calling party, for example, would like to have the name of a music clip that was played to him/her or the name of the artist or other type of information relating to the music clip, on request of the calling party, this information is provided electronically. Accordingly, the calling party does not need himself or herself to search for this information, with the risk of not being successful at all.

In accordance with the invention, the information is provided from a database, such as a content database server, which operatively connects to the communications system. That is, the database or database server may form part of or is internal to the communications system and/or may be external to but accessible by the communications system.

In an embodiment of the method according to the present invention, the information may be provided to the calling party in at least one of a text form, a graphical form, a picture form, a video form, an audio form or any other data form. The information can be provided, for example, using a Short Messaging Service (SMS) available to the calling user. For example the SMS used in a GSM-system. In another embodiment of the method according to the invention, the information may be provided using a Multi-media Messaging Service (MMS), if available to the calling user. Because the information is provided in the course of a call from a calling party to a called party, the identity of the calling party is implicitly known and the information can be directly delivered. However, in alternative embodiment of the invention, the calling party may be prompted to provide a delivery address for delivering the information.

In a preferred embodiment of the method according to the invention, the information is provided on a display of a communications terminal used by the calling party for calling the called party.

In further embodiments of the method according to the invention, the calling party can directly indicate or is prompted to indicate whether to receive the information. For indicating a request directly or after a prompt, in accordance with a further embodiment of the invention, a keypad of a communications terminal used by the calling party for calling the called party is enabled for providing the request. That is, the calling party may reply using the keypad of his or her communications terminal. For example, by pressing a dedicated button (dialing a dedicated character) on the keypad, such as dialing the digit "5", or by dialing two or more digits or characters. It will be appreciated that other input means of the communications terminal may be enabled and used for indicating a request or to reply to a prompt such as, for example, a touch screen or the like.

In a preferred embodiment of the invention, the prompt is provided to the calling party while the message is playing. In accordance with the invention, a predetermined reply time interval may be set from the point in time of providing the prompt, in order to urge the calling party to quickly reply to the prompt.

In a further preferred embodiment of the method according to the invention, the information presented to the calling party comprises a plurality of selectable options on how and in what form to receive further information relating to the message, such as, but not limited to, options including downloading of a datafile comprising the content or part of the content of the message or content comparable to the message. That is, in the event of a music clip, the calling party may receive information of a website or other download server or database, for example, for downloading the audio clip as an MP3 file or other audio file format. In the event of a video message or a picture message, the file to be downloaded may be a video file in the well-known MPEG or other available picture format. It will be appreciated that the message to be played to the calling party can be just a part of a complete song or video clip or the like and that the file to be downloaded may comprise the complete song or complete video clip.

In accordance with the invention, the database, such as a content database server, from which the further information may be downloaded or retrieved operatively connects to the communications system. That is, the database or database server may form part of or is internal to the communications system and/or may be external to but accessible by the communications system, and for transferring content retrieved through the communications system or another communications facility available to the calling party.

In accordance with a further embodiment of the method according to the invention, the data file may be directly downloaded into the communications terminal used by the calling party, or in a computer system, or an audio system or a video system or the like, for example via email or another suitable data download service. Because the download is requested in the course of an ongoing call or a call from which only the called party has been disconnected, the identity of the calling party is implicitly known and the requested content can be directly delivered into the communications terminal of the calling party, for example. However, in alternative embodiment of the invention, the calling party may be prompted to provide a delivery address for delivering the content, such as an email address, for example.

In the event of a data file directly loaded into the communications terminal of the calling party, the data file is provided, in accordance with the method of the invention, as a ring tone to be used for alerting the calling party of a call.

In a yet further embodiment of the method according to the invention, the file is a message file for use by the calling party as a message to be played when the calling party itself is called by another party and the calling party has not answered the call. That is, the file is used by the calling party for its own personalized PGS, for example. The message can be personalized by the party receiving same, for example for playing when the specific called party, which has provided the information as to the message, calls the calling party. It will be appreciated that the message likewise can be used for personalizing calls from any specific other party.

In particular in the case of downloading music files and video files and the like, the method according to the invention is arranged for charging the costs for downloading the file to an account provided by the calling party. By default, the phone bill or pre-paid account of the calling party will be charged. However, the calling party, in the course of downloading a file, may be asked for inputting an account at a bank or the like. It will be appreciated that the file will not be provided for downloading if the account is not save or otherwise compromised for charging. Further, if no file will be downloaded at all, no charges will apply, of course.

The invention further provides a communications system arranged for operating the method of the invention as disclosed above. The communications system may be arranged for providing wired and/or wireless communications, in particular wireless radio telephone communications. For the purpose of the present invention, the communication system may comprise a content server arranged for providing the information and/or downloading message content to be requested by the calling party and for storing this information by the called party while personalizing his or her PGS.

The above-mentioned and other features and advantages of the invention will be best understood from the following description, with reference to the enclosed drawings.

In the drawings, like reference numerals denote identical parts or parts performing an identical or comparable function or operation.

DETAILED DESCRIPTION OF PREFERRED EMBODIMENTS

Figure 1A:
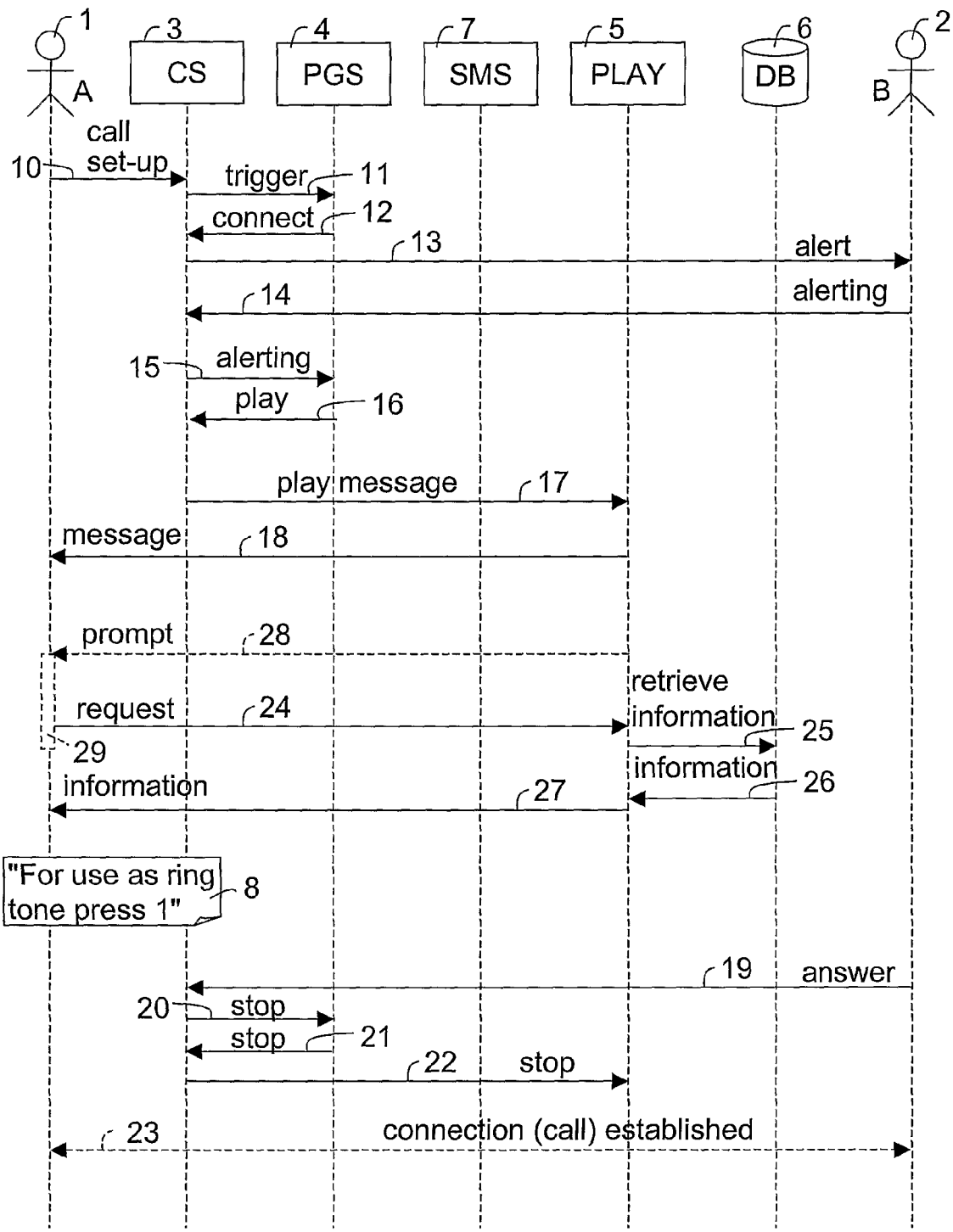
FIG. 1a and FIG. 1b show a simplified flow chart of an embodiment of the method according to the invention, for retrieving a message played to a calling party as a ring tone file.

FIG. 1a shows a simplified flow chart of a Personalized Greeting Service (PGS) in accordance with the present invention in a communications system such as a telephone communications system.

Reference numeral 1 denotes a first user A or calling party and reference numeral 2 denotes a second user B or called party. The Communications System (CS), either a fixed or wired system, such as the Public Switched Telephone Network (PSTN) or the Integrated Services Digital Network (ISDN), or a wireless communications system, such as, for example, the cellular Global System for Mobile communications (GSM), is generally indicated by reference numeral 3. The PGS, as in operation in the communications system 3, is separately indicated and denoted with reference numeral 4. Those skilled in the art will appreciate that the PGS 4 may form an integral part of the software for controlling the communications system 3, for example. Reference numeral 5 denotes playing means (PLAY), for playing a message associated with the PGS 4. Reference numeral 6 denotes a content DataBase (DB) provided in accordance with the present invention, for storing information relating to a message to be played by the playing means 5 in the context of the PGS 4. Reference numeral 7 denotes a messaging service, such as the Short Messaging Service (SMS) available in the GSM, for providing information from the content database 6 to the calling party 1 in accordance with the present invention. In this type of flow charts, the time line runs from the top to the bottom of the figure and is not shown for convenience sake.

When the calling party 1 wishes to communicate with another party in the communications system 3, the first step is initiating 10 or setting up a call by the calling party 1 to a called party 2. The communications system 3, receiving the request for setting up a call to the called party 2, provides a trigger 11 to the PGS 4, assuming that the called party 2 has availed himself/herself with this service. The PGS 4 triggers 12 the connection to the called party 2, while the called party 2 is alerted 13 by the communications system 3.

Once it has been established that a telecommunications terminal, for example a telephone, of the called party 2 is alerted 14, the communications system 3 informs 15 the PGS 4 accordingly. In response to this information, the PGS 4 activates 16 the playing means 5, via the communications system 3, to start 17 playing a message to the calling party 1, indicated by arrow 18 in FIG. 1. The message is played 18 over a communications path of the communications system 3 to a communications terminal that the calling party 1 uses for setting up the call, till the called party 2 answers 19 the call request by accepting the call. This leads to an answer message 20 of the communications system 3 to the PGS 4 and a stop message 21 from the PGS 4 to the communications system 3 to stop 22 the playing means 5. This will terminate the transfer of the message to the calling party 1. A communications link 23, indicated by a dashed double arrow, is established between the calling party 1 and the called party 2.

In accordance with the method of the present invention, if the calling party 1 would like to retrieve information associated with the message played 18, the calling party 1 indicates 24 a request to the playing means 5 to retrieve 25 this information from the content database 6. For example, by pressing a dedicated button (dialing a dedicated character) on the keypad of a communications terminal that the calling party 1 uses for setting up the call, such as dialing the digit "5", or by dialing two or more digits or characters. In response to this request, the content database 6 provides 26, 27 the requested information to the calling party 1. The information may be provided to the calling party 1 via the playing means 5, as shown in FIG. 1a, or directly from the content database 6 (not shown).

The information 27 may be presented to the calling party as a text, as a graphic, a picture, a video or any other suitable form, including a spoken message which can be received on a telecommunications terminal used by the calling party 1 to call the called party 2.

In an alternative embodiment of the invention, the calling party 1 may be prompted to indicate whether to receive the information, such as indicated by a dashed arrow 28. The playing means 5 forward an announcement to the calling party 1 as to request for the respective information. In accordance with the present invention, this announcement may prompt the calling party 1 to request the information during a predetermined time interval 29, for example within three seconds from the end of the announcement.

As already indicated above, the information may comprise details about a message played to the calling party 1, such as the title of a song, the author of a poem, the director of a video clip or any other information which might be of interest for the calling party 1. This information is stored, in accordance with the present invention, in the content database 6. It will be appreciated, that the relevant information may be stored anywhere in the communications system 3 or in a remote database to which the communications system 3 may connect. For the purpose of the present invention, all these options are construed to be represented by the content database 6.

The information 27 may comprise an option on how and in what form to receive further information relating to the message, such as retrieving the message for use as a ring tone by the calling party 1, e.g. 'For use as ring tone press "1"', see text block 8 in FIG. 1a.

In the case that the information 27 provides the calling party 1 an option to download the message or part of the message or content comparable to the message as a ring tone for use in the communications terminal of the calling party 1, the calling party 1 makes a choice by entering a reply on the keypad, a touch-screen or any other suitable input device of the communications terminal of the calling party 1.

Figure 1B:
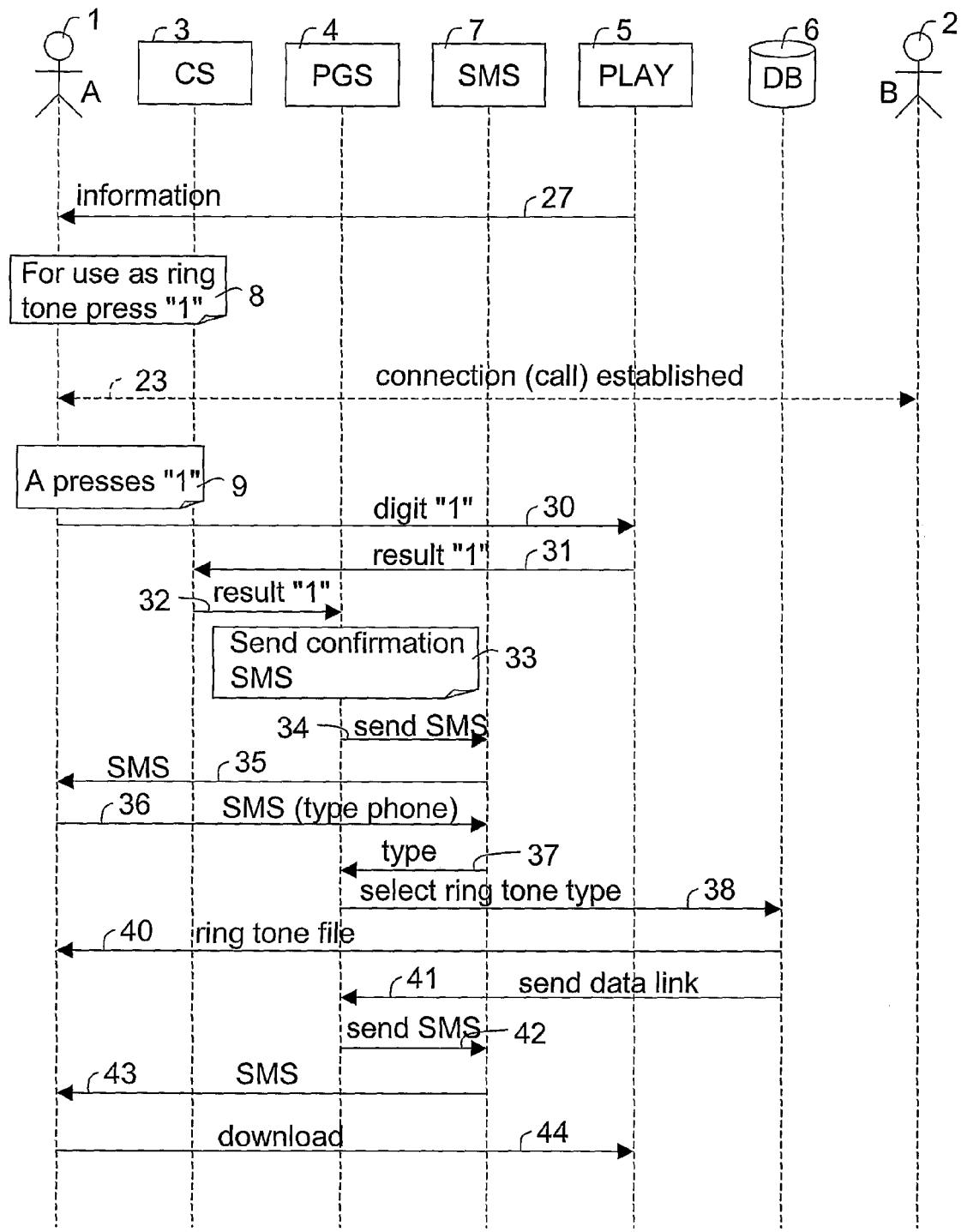

The actual download of the content can be provided after a connection 23 has been established between the calling party 1 and the called party 2, which is indicated in the flow chart of FIG. 1b. In this embodiment, it is assumed that the calling party 1 is able to receive messages via SMS.

For convenience sake, in FIG. 1b, it is repeatedly indicated that information 27 is provided with an option to download the message as a ring tone file, as indicated by text block 8. Further the establishing 23 of the connection or call between the calling party 1 and the called party 2 has been indicated.

After indicating 30 by the calling party 1, in response to the option provided as indicated in text block 8, by pressing a "1", that he or she wishes to download the message as a ring tone, and possibly the type of ring tone to be downloaded, which may also be implicitly clear from the type of telecommunications terminal of the calling party, as indicated by text block 9 in FIG. 1b, i.e. 'A presses "1"', the selection will be confirmed 31 to the communications system 3 which, in turn, initiates 32 an SMS 33. To this end, the PGS 4 triggers 34 the SMS service 7 which forwards 35 the SMS to the calling party 1.

The SMS 33 may prompt the calling party 1 to provide additional information, for example the type of telephone or account information for charging purposes, to which the calling party 1 responds 36. This response is forwarded 37 from the SMS service 7 to the PGS 4 and forwarded 38 by the PGS 4 to the database 6.

The content database 6 will provide the requested ring tone to the calling party 1, for example, through a GPRS data channel, indicated by reference numeral 40. In the alternative, a further SMS may be forwarded to the calling party 1, informing the same of a datalink, for example, at which the ring tone can be downloaded externally. In FIG. 1, this is indicated by the sequence of steps 41, 42, 43. Eventually the calling party 1 will make a connection to the content database 6 for downloading the ring tone, indicated by arrow 44.

Charging for the content to be downloaded, if required, can be provided by debiting the user account of the calling party or a prepaid account or any other bank account which may be provided by the calling party 1. This type of charging is known to those skilled in the art and does not need not to be further elucidated here.

It will be appreciated that if the calling party does not reply to the SMS 33, the content database will not take any further action, which implies that the calling party does not receive the ring tone and will not be charged.

If the ring tone is not available, then the information 27 provided to the calling party 1 may exclude this option. Availability of content in a particular form may be established by the PGS 4 in the course of playing the message to the calling party (not shown). Of course, the calling party 1 may be informed by an SMS once a download cannot be completed, for what reason ever, (not shown).

Figure 2:
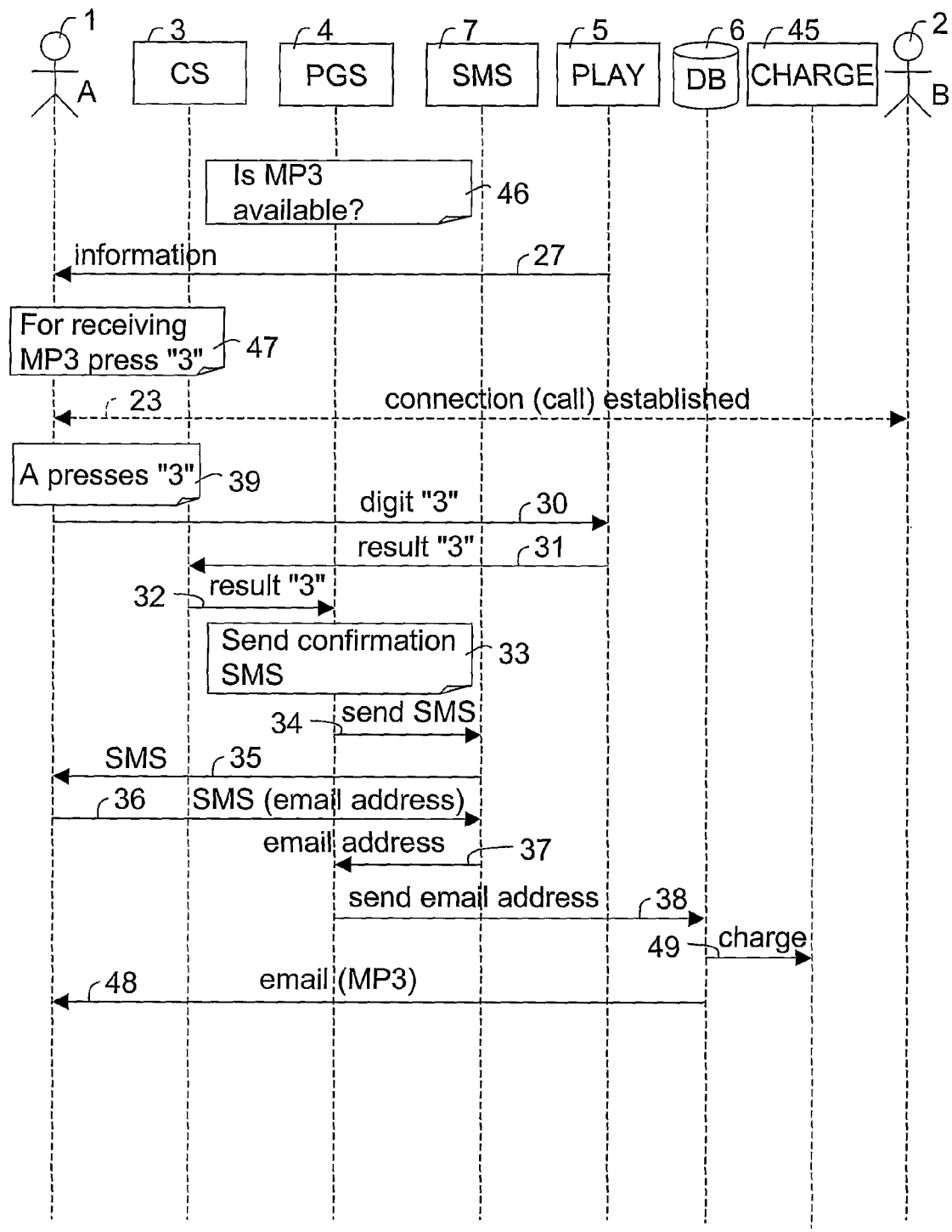
FIG. 2 shows a simplified flow chart of an embodiment of the method according to the invention, for retrieving a message played to a calling party as an audio file.

FIG. 2 shows a flow chart for retrieving the message in a form of an audio file, such as an MP3 file, via e-mail. However, those skilled in the art will appreciate that the file may be forwarded using any other suitable data delivery service or data download service, known in the art or which may become available in future.

The steps of establishing a call from the calling party 1 to the called party 2 are identical to what has been disclosed above in connection with FIG. 1a. In FIG. 2, not all these steps are repeated, just those steps are indicated which are helpful for understanding this particular embodiment of the invention. It is indicated that information 27 is provided with an option to download the message 18 as an audio, i.e. MP3, file as indicated by text block 47, e.g. 'For receiving MP3 press "3"'. Further the establishing 23 of the connection or call between the calling party 1 and the called party 2 has been indicated.

Reference numeral 47 denotes the content of the message 27 provided to the calling party 1 on how to select the download of the audio file. In this example, the calling party 1 is requested to press digit "3" on the keypad of the telecommunications terminal used by the calling party 1 for calling the called party 2. As disclosed above, other input options may be provided.

After indicating 30 by the calling party 1, in response to the option provided as indicated in text block 47, by pressing a "3", that he or she wishes to download the message as an MP3 file. See text block 39, i.e. 'A presses "3"'. The selection of the "3" will be confirmed 31 to the communications system 3 which, in turn, initiates 32 an SMS 33. To this end, the PGS 4 triggers 34 the SMS service 7 which forwards 35 the SMS to the calling party 1.

The SMS 33 may prompt the calling party 1 to provide additional information, in this case the email address at which the MP3 file has to be delivered. The calling party 1 responds 36 accordingly by sending an SMS with the requested email address. This response is forwarded 37 from the SMS service 7 to the PGS 4 and forwarded 38 by the PGS 4 to the database 6.

Eventually, as indicated at the bottom of the flow chart of FIG. 2, an e-mail will be forwarded 48 from the content database 6 to the calling party 1 including the requested audio file in MP3 format. It will be appreciated that the content database 6, to this end, is arranged for sending e-mails. In the alternative, the content database 6 may be arranged for providing the requested file through other channels such as MMS, through a WAP-push, etc., which will be clear those skilled in the art.

In addition to the embodiment shown in FIG. 1*b*, a charging service 45 is indicated for charging 49 of an audio file which is forwarded to the calling party 1.

Further, as indicated above, in order to avoid presenting options for a user to download content which is not available, an additional step 46 is introduced, wherein the PGS 4 checks which options for retrieving information of a message by a calling party 1 are available, before providing the information 27. In this example, a check is made whether the message is available as an audio file in MP3 format. The step 46 may be performed, for example, after the PGS 4 has been informed 15 of the alerting of the called party 2 (see FIG. 1*a*).

Although the downloading of a message file for use as a ring tone or in the form of an audio file are presented as separate embodiments and figures, it will be appreciated that the information 27 may provide the calling party 1 several options at the same time, such as the option 8 for retrieving the message as a ring tone or the option 47 for retrieving the message as an MP3 file. Other options may be available.

Figure 3:
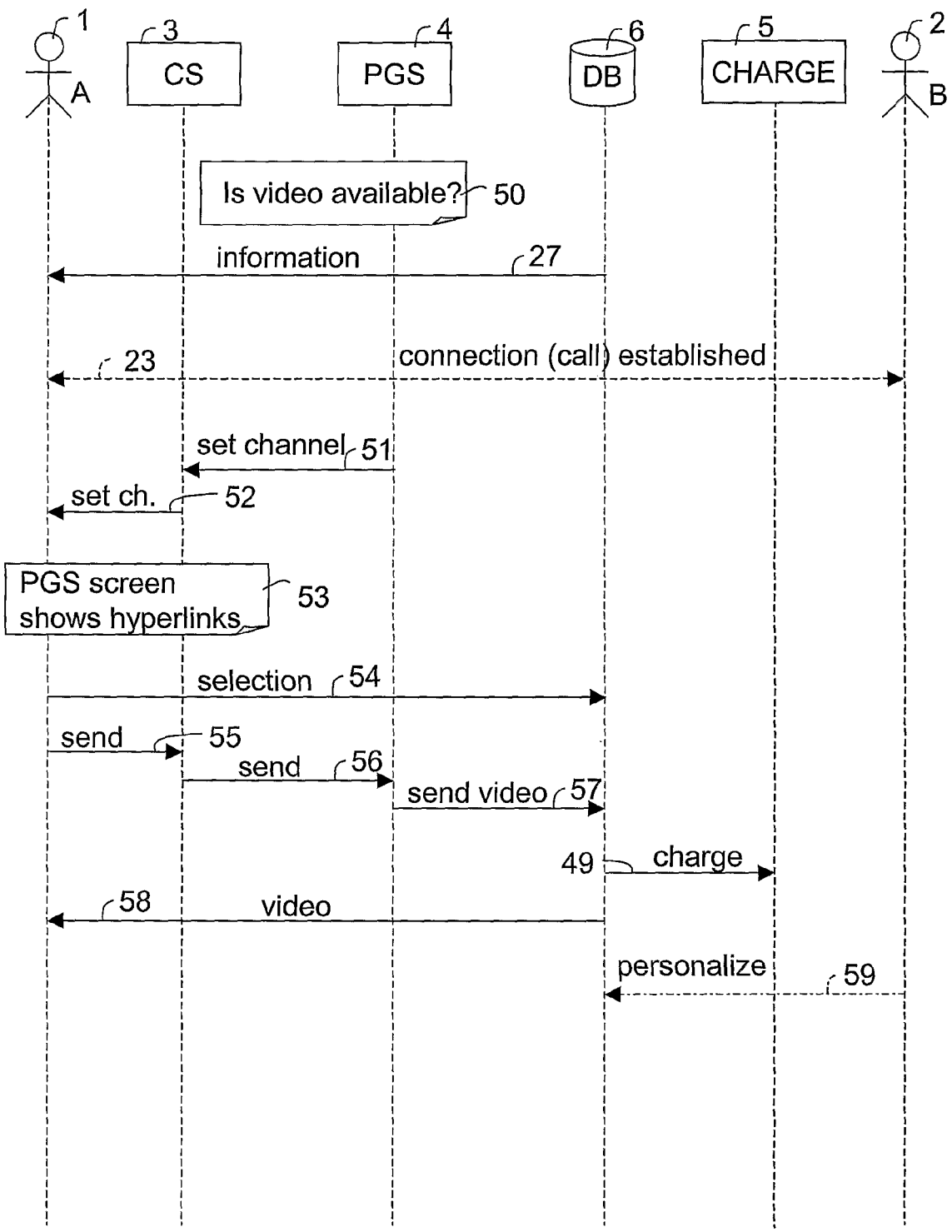
FIG. 3 shows a simplified flow chart of another embodiment of the method according to the invention, for retrieving a message played to a calling party as a video file.

FIG. 3 shows an embodiment of the method according to the present invention, for retrieving a video clip, in general a multi-media message, from the content database 6 in the course of a video clip or the like played by the PGS 4.

The steps of establishing a call from the calling party 1 to the called party 2 are identical to what has been disclosed above in connection with FIGS. 1*a* and 2. In FIG. 3, not all these steps are repeated, just those steps are indicated which are helpful for understanding this particular embodiment of the invention. It is indicated that information 27 is provided. Further the establishing 23 of the connection or call between the calling party 1 and the called party 2 has been indicated.

In step 50 the PGS 4 checks whether the message 18 can be downloaded as a video clip, indicated by the text block 'Is video available?' The step 50 may be performed, for example, after the PGS 4 has been informed 15 of the alerting of the called party 2 (see FIG. 1*a*).

While assuming that the call is set up through a Circuit Switched Channel or the like, i.e. a voice or speech channel, the video clip will be delivered to the calling party 1 through a separate data channel, which has to be set up first. Setting up this data channel is indicated by reference numerals 51 and 52, assuming that the communications terminal of the calling party 1 is arranged for receiving such data files.

In the embodiment shown, if the calling party 1 replies to the alert provided, information 53 may be displayed on a display of the communications terminal providing the calling party 1 a number of hyperlinks for retrieving the video clip. A selection made by the calling party 1 is forwarded in a number of steps 54, 55, 56, 57 to the content database 6 eventually resulting in downloading 58 the requested video clip to the calling party 1, i.e. directly into the telecommunications terminal. However, any other suitable data receiving means may be used by the calling party 1 to receive the requested video clip. This, of course, requiring additional information for the PGS 4 to set up a data link 51, 52 to the respective data receiver. Charging 49 may be performed as disclosed above.

Those skilled in the art will appreciate that the prompts or announcements and information provided to the calling party 1 may be very divers and may depend on the content available.

In FIG. 3, the dashed dotted arrow 59 schematically indicates that the called party (in general any party having the availability of PGS) may store content in the database 6 relating to a personalized message to be played by the PGS 4. Although not explicitly indicated, the option of personalizing the PGS and content and/or related information may also be provided in the embodiments of FIGS. 1*a*, 1*b* and 2.

Figure 4:
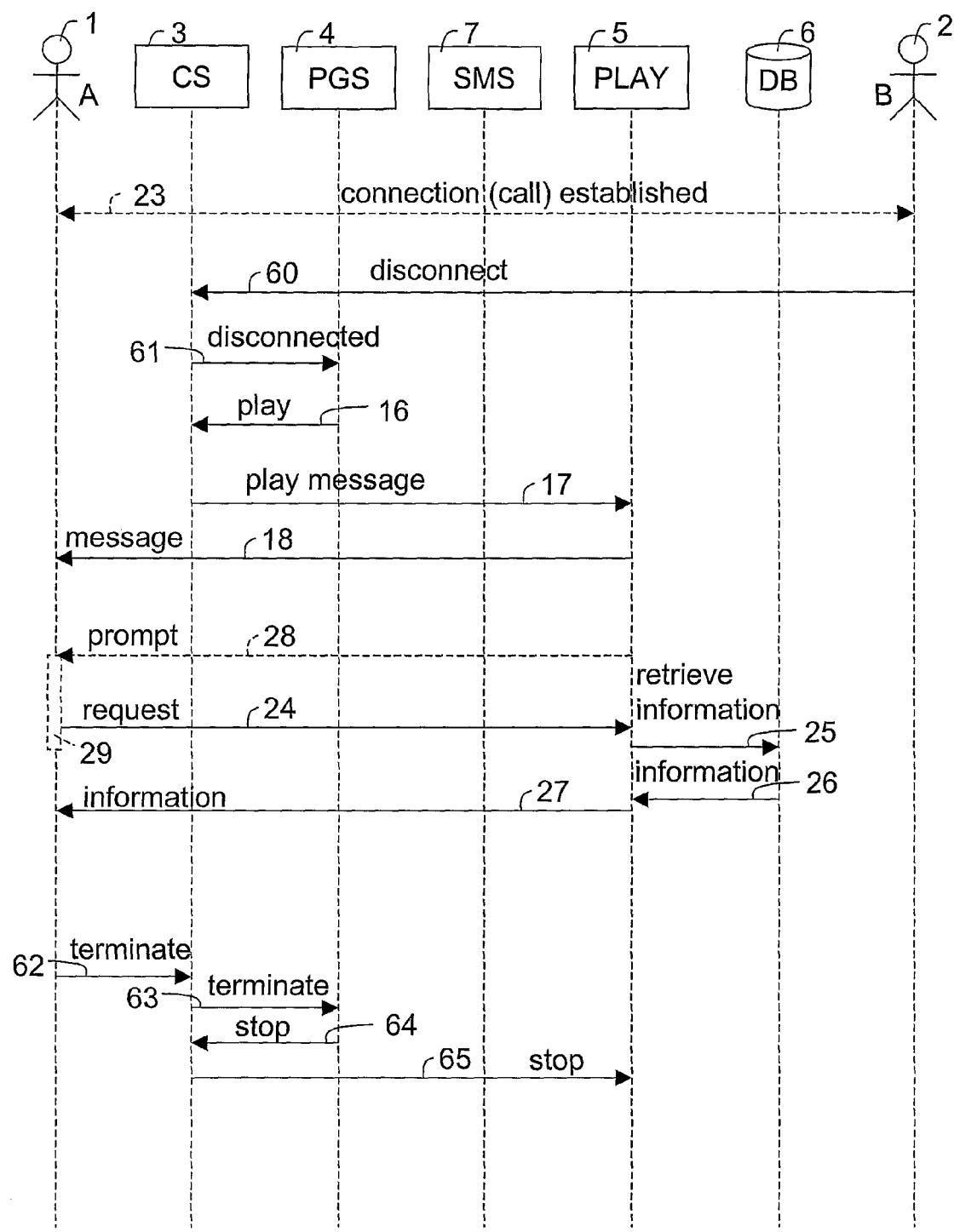
FIG. 4 shows a simplified flow chart of an embodiment of the method according to the invention, for retrieving a message played to a calling party after the called party has been disconnected from a call.

FIG. 4 shows a simplified flow chart of an embodiment of the method according to the invention, for retrieving a message 18 played to a calling party 1 after the called party 2 has been disconnected from a call, in a communications system arranged for providing messages to the calling party as disclosed in applicant's co-pending International Patent Application, titled "A method of and a communications system for playing a message to a calling party", Attorney ref. 217477 and any patent applications and patents corresponding therewith, and which are here incorporated by reference. With reference numeral 23 an established call has been indicated.

If the called party 1 disconnects 60 from the call, while the calling party 1 resumes connected, the communication system 3 informs 61 the PGS 4 accordingly, which in turn instructs 16, 17 the playing means 5 to provide the message 18, and so on, as disclosed above in relation to FIG. 1*a*.

The applications shown in FIGS. 1*b*, 2 and 3 may be likewise applied for retrieving or downloading the message 18, or content comparable or related therewith.

The procedure may stop, for example, if the calling party 1 terminates the call 23, as indicated by the series of steps 62, 63, 64 and 65. Note that in the event of downloading a file through another channel or link than the communications (or speech) link of the call, this download may continue after termination 62 of the call 23.

Figure 5:
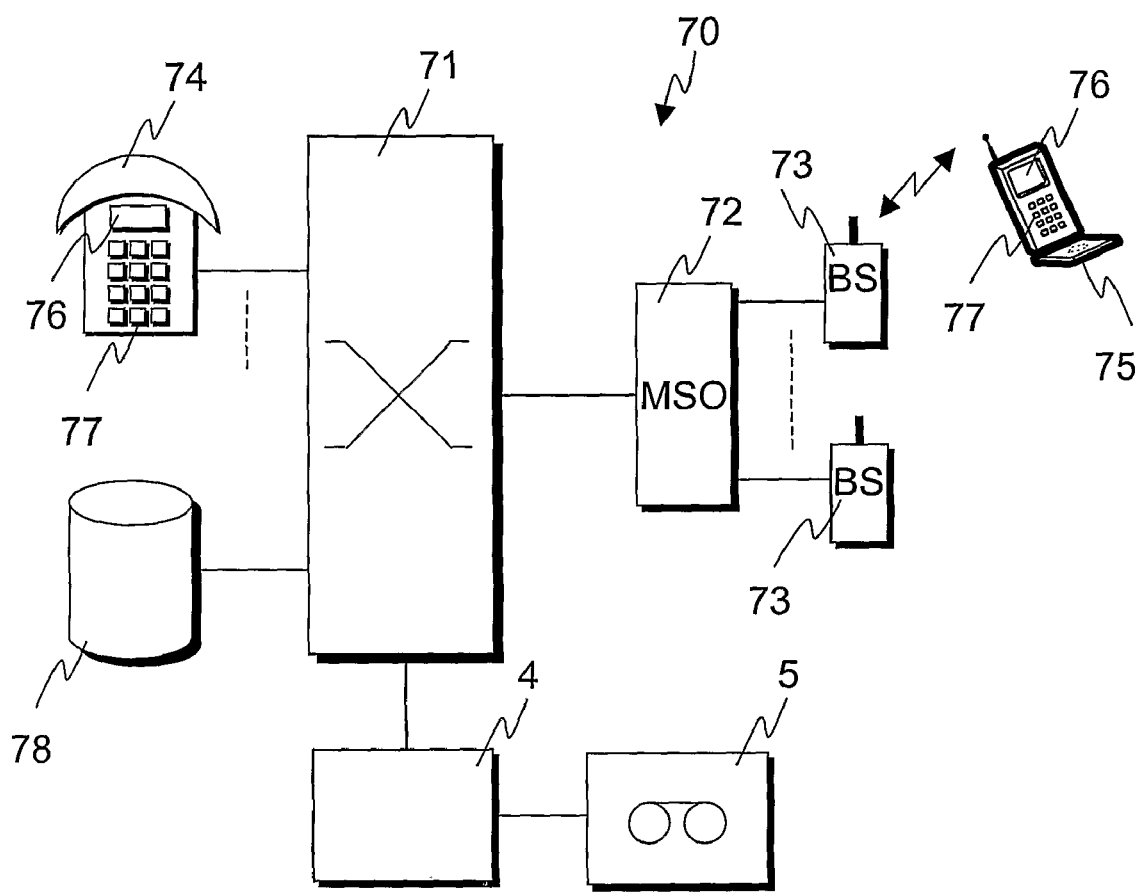
FIG. 5 shows, in a schematic and illustrative manner, a communication system arranged for operating in accordance with the present invention.

FIG. 5 shows, in a very schematic embodiment, a communications system 70 according to the present invention. For illustration purposes, the system 70 comprises both a fixed part 71 and a wireless part 72.

The fixed or wired part 71 may comprise a PSTN and/or an ISDN network, preferably an Intelligent Network (IN) network configuration, as are well known to those skilled in the art. The wireless part 72 comprises, for example, a Mobile Switching Office (MSO), coupled to the fixed part 71, controlling several radio access units or radio Base Stations (BS) 73 such as operating under the GSM or another suitable wireless communication protocol.

Many users or subscribers communicate with a wired communications terminal 74 via the fixed part 71 and many users or subscribers communicate with a mobile communications terminal 75 via the mobile part 72 of the communications system 70.

Each of the communications terminals 74, 75 comprise display means 76 and keypad means 77, and may be standard telecommunications terminals known in practice, such as standard telephone terminals.

The communications system 70 further comprises a PGS 4 and playing means 5 as disclosed above. Although shown as separate components in FIG. 4, the playing means 5, and the PGS 4 may be integral to any or both of the fixed part 71 and the wireless part 72 of the communications system 70. Either alone or in combination implemented in software and/or in hardware form.

In accordance with the present invention, the communications system 70 comprises or is connected or can be connected to at least one content database 78 or content database server, wherein the information and messages are stored for providing to the calling party. The playing means 5, the PGS 4 and the content database 78 are arranged for performing the method of the invention as disclosed above.

In a Circuit Switched communication environment, for example, during the alerting phase 13, 14 of the called party 2, only a one-way speech connection from the database server 6 to the calling party 1 is available. Transport of commands inputted by the calling party 1, such as DTMF tones from the keypad of a telecommunications terminal as in-band information is not possible before the active phase 23 of the call. As a result, the calling party 1 may not be able to select an option during the alerting phase of the call.

This problem can be solved, in particular in a mobile or wireless communications system, by preparing the mobile communications terminal 55 and the base stations 53 and the MSO 52 for receipt of DTMF during alerting. Using Bearer Independent Call Control (BICC) signalling, a DTMF digit can be sent as out-band information to the MSO of the called party 2. The MSO of the called party 2 has to forward the DTMF tones to the internal Service Switching Function (SSF) which detects this BICC-signalling for DTMF-digits and notifies the Service Control Point (SCP) running the PGS about the event. Hereto, the SCP shall have armed the mid-call Event Detection Point (EDP). The SCP receives the event-notification and acts as required, for example by forwarding an SMS as described in FIGS. 1 en 2.

Although the method of the invention has been illustrated for some particular cases, in general, the invention is applicable for providing a calling party information of a message that is played to the calling party in a communications system in the course of call, whereby this information is provided electronically, such as by a database or database server, on request of the calling party.

The present invention is not limited to the embodiments disclosed above. Those skilled in the art may modify and implement the invention, however without having to apply inventive skills.

The invention claimed is:

1. A method, in a communications system, of providing a calling party information of a message that is played to said calling party, in response to a communications link being established between the calling party and a called party, while the called party is being alerted of the call, wherein said information is provided electronically on request, the method comprising:

said information presenting a plurality of options, selectable by the calling party, on how and in what form to receive further information relating to said message, wherein said options include:

downloading a data file comprising at least one of said message, part of said message and content comparable to said message.

2. The method according to claim 1, wherein said further information is provided from a database such as a content database server, operatively connected to said communications system.

3. The method according to claim 1, wherein said data file is at least one of an audio file, a video file and a picture file for receipt by at least one of a communications terminal used by said calling party for calling said called party, a computer system connected to a data network, an audio system and a video system arranged for receiving and processing said file.

4. The method according to claim 1, wherein said data file is a ring-tone for storing in a communications terminal.

5. The method according to claim 1, wherein said data file is a message file for use by said calling party as a message to be played when said called party is alerted of a call.

6. The method according to claim 1, wherein said data file is personalized.

7. The method according to claim 1, wherein downloading of said data file is charged to an account provided by said calling party.

8. The method according to claim 1, wherein said information is provided on request of said calling party.

9. The method according to claim 1 wherein said calling party indicates to said communications system whether to receive said information.

10. The method according to claim 1, wherein said calling party indicates to said communications system whether to receive said information by using any of a keypad a touch screen and other input device of a communications terminal used by said calling party for calling said called party being arranged for providing said indication.

11. The method according to claim 1, wherein said calling party is prompted to indicate whether to receive said information.

12. The method according to claim 1, wherein said information is provided using a Multi-media Messaging Service MMS available to said calling user.

13. The method according to claim 11, wherein said calling party is prompted to request whether to receive said information during a predetermined time interval.

14. The method according to claim 11, wherein said prompt is provided audibly to said calling party through a communications terminal use by said calling party for calling said called party.

15. The method according to claim 11, wherein said prompt is presented on a display of a communications terminal used by said calling party for calling said called party.

16. The method according to claim 1, wherein said information is provided from a database, such as a content database server, operatively connected to said communications system.

17. The method according to claim 1, wherein said information is provided to said calling party in at least one of a text form, a graphical form, a picture form, a video form an audio form and a data form.

18. The method according to claim 15, wherein said information is provided using a Short Messaging Service SMS available to said calling user.

19. The method according to claim 15, wherein said information is provided using a Multi-media Messaging Service (MSM), available to said calling user.

20. The method according to claim 1 any of the previous claims, wherein said message is at least one of a spoken message, an audio message, a graphical message, a video message, a picture message and a data message.

21. An apparatus, in a communications system, for providing a calling party information of a message that is played to said calling party in response to a communications link being established between the calling party and a called party, while the called party is being alerted of the call, wherein said information is provided electronically on request, the apparatus comprising:

means for said information presenting a plurality of options, selectable by the calling party, on how and in what form to receive further information relating to said message, wherein said options include downloading a data file comprising at least one of said message, part of said message and content comparable to said message.

22. The apparatus according to claim 21, wherein said further information is provided from a database such as a content database server, operatively connected to said communications system.

23. The apparatus according to claim 21, wherein said data file is at least one of an audio file, a video file and a picture file for receipt by at least one of a communications terminal used by said calling party for calling said called party, a computer system connected to a data network, an audio system and a video system arranged for receiving and processing said file.

24. The apparatus according to claim 21, wherein said data file is a ring-tone for storing in a communications terminal.

25. The apparatus according to claim 21, wherein said data file is a message file for use by said calling party as a message to be played when said called party is alerted of a call.

26. The apparatus according to claim 21, wherein said data file is personalized.

27. The apparatus according to claim 21, any of the previous claims, wherein downloading of said data file is charged to an account provided by said calling party.

28. The apparatus according to claim 21, wherein said information is provided on request of said calling party.

29. The apparatus according to claim 21, further comprising means for said calling party indicating to said communications system whether to receive said information by using any of a keypad a touch screen and other input device of a communications terminal used by said calling party for calling said called party being arranged for providing said indication.

30. The apparatus according to claim 21, wherein said information is provided using a Multi-media Messaging Service MMS available to said calling user.

31. The apparatus according to claim 21, wherein said message is at least one of a spoken message, an audio message, a graphical message, a video message, a picture message and a data message.

* * * * *

UNITED STATES PATENT AND TRADEMARK OFFICE
CERTIFICATE OF CORRECTION

PATENT NO. : 8,325,887 B2  
APPLICATION NO. : 12/159567  
DATED : December 4, 2012  
INVENTOR(S) : Noldus et al.

Page 1 of 1

It is certified that error appears in the above-identified patent and that said Letters Patent is hereby corrected as shown below:

In the Drawings

In Fig. 3, Sheet 4 of 6, delete Tag "5" and insert Tag -- 45 --, therefor.

In the Specifications

In Column 9, Line 46, delete "en" and insert -- and --, therefor.

In the Claims

In Column 10, Line 29, in Claim 9, delete "1" and insert -- 1, --, therefor.

In Column 10, Line 34, in Claim 10, delete "keypad" and insert -- keypad, --, therefor.

In Column 10, Line 60, in Claim 17, delete "video form" and insert -- video form, --, therefor.

In Column 10, Line 67, in Claim 19, delete "(MSM)," and insert -- (MMS), --, therefor.

In Column 11, Lines 1-2, in Claim 20, delete "claim 1 any of the previous claims," and insert -- any of the previous claims, --, therefor.

In Column 12, Lines 8-9, in Claim 27, after "21," delete "any of the previous claims,".

In Column 12, Line 16, in Claim 29, delete "keypad" and insert -- keypad, --, therefor.

Signed and Sealed this  
Thirtieth Day of July, 2013

Teresa Stanek Rea  
*Acting Director of the United States Patent and Trademark Office*